US011763174B2

(12) United States Patent
Tomonaga

(10) Patent No.: US 11,763,174 B2
(45) Date of Patent: Sep. 19, 2023

(54) LEARNING MATERIAL RECOMMENDATION METHOD, LEARNING MATERIAL RECOMMENDATION DEVICE, AND LEARNING MATERIAL RECOMMENDATION PROGRAM

(71) Applicant: NEC Corporation, Tokyo (JP)

(72) Inventor: Yasuyuki Tomonaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1076 days.

(21) Appl. No.: 16/484,903

(22) PCT Filed: Jan. 26, 2018

(86) PCT No.: PCT/JP2018/002551
§ 371 (c)(1),
(2) Date: Aug. 9, 2019

(87) PCT Pub. No.: WO2018/168220
PCT Pub. Date: Sep. 20, 2018

(65) Prior Publication Data
US 2020/0057949 A1 Feb. 20, 2020

(30) Foreign Application Priority Data
Mar. 14, 2017 (JP) .................................. 2017-048776

(51) Int. Cl.
*G06N 5/04* (2023.01)
*G06N 20/00* (2019.01)
(Continued)

(52) U.S. Cl.
CPC .............. *G06N 5/04* (2013.01); *G06N 20/00* (2019.01); *G06Q 50/20* (2013.01); *G09B 19/00* (2013.01)

(58) Field of Classification Search
None
See application file for complete search history.

(56) References Cited

U.S. PATENT DOCUMENTS 5,724,987 A * 3/1998 Gevins ..................... A61B 5/16
434/258
8,341,095 B2 12/2012 Bai et al.

FOREIGN PATENT DOCUMENTS

JP 10-78743 A 3/1998
JP 2002-108190 A 4/2002
(Continued)

OTHER PUBLICATIONS

Seiji Takeda et al., "Method of Estimating Concentration in Exercise Game by Combining Multiple Physiological Indices", The 29th Annual Conference of the Japanese Society for Artificial Intelligence, 3D3-4, 2015, pp. 1-4 (4 pages total).
(Continued)

*Primary Examiner* — James B Hull
(74) *Attorney, Agent, or Firm* — Sughrue Mion, PLLC

(57) ABSTRACT

A learning material recommendation device recommends a learning material that should be learned next by a learner on the basis of the learner's comprehension and concentration degree. The learning material recommendation device includes estimation means for estimating a concentration degree indicating the degree of concentration of a learner on a learning material, on the basis of learner data including a feature related to the learner and learning material data including a feature related to the learning material, and learning material selection means for selecting one from among next learning material candidates associated with the learning material, on the basis of a learning state that is specified on the basis of the concentration degree and a comprehension of the learning material by the learner.

6 Claims, 11 Drawing Sheets

(51) Int. Cl.
    *G06Q 50/20*     (2012.01)
    *G09B 19/00*     (2006.01)

(56)     References Cited

FOREIGN PATENT DOCUMENTS

| | | |
|---|---|---|
| JP | 2003-98947 A | 4/2003 |
| JP | 2004-229948 A | 8/2004 |
| JP | 2007-272186 A | 10/2007 |
| JP | 2007-310044 A | 11/2007 |
| JP | 2013-242434 A | 12/2013 |
| WO | 2014/141414 A1 | 9/2014 |

OTHER PUBLICATIONS

Japanese Office Action for JP Application No. 2019-505746 dated Jan. 5, 2021 with English Translation.
International Search Report on International Application No. PCT/JP2018/002551, dated May 1, 2018.
Written Opinion in International Application No. PCT/JP2018/002551, dated May 1, 2018.
Dmitriy Bespalov et al., "Sentiment Classification with Supervised Sequence Embedding", Springer-Verlag, 2012 (16 pages total).

\* cited by examiner

FIG. 1

| | | GROWTH | |
|---|---|---|---|
| | | LOW | HIGH |
| COMPREHENSION | HIGH | (2) too easy<br>MAKE ADJUSTMENT IN LEARNING PROCESS (CHANGE TO A LITTLE MORE DIFFICULT MATERIAL) | (1) best fit<br>MAINTAIN THE CURRENT LEARNING PROCESS (AN OPTIMAL LEARNING STATE) |
| | LOW | (4) less motivated<br>MAKE ADJUSTMENT IN LEARNING PROCESS (IMPROVE THE MOTIVATION TO LEAR) | (3) too much<br>MAKE ADJUSTMENT IN LEARNING PROCESS (CHANGE TO A LITTLE MORE EASIER MATERIAL) |

FIG. 3

| LEARNER ID | NAME | AGE | GENDER | SELF-INTRODUCTION | LEARNING TARGET |
|---|---|---|---|---|---|
| U01 | ICHIRO YAMADA | 22 | MALE | I'M JUST FULL OF MOTIVATION. | I WANT TO BE A LAWYER. |
| U02 | HANAKO YAMASHITA | 28 | FEMALE | I'M JUST FULL OF CONFIDENCE. | I WANT TO BE AN ACCOUNTANT. |
| U03 | JIRO YAMAMOTO | 48 | MALE | I'M NOT GOOD WITH DIFFICULT THINGS. | I'M ASPIRING TO BE A TAX ACCOUNTANT. |
| U04 | SABURO MATSUDA | 36 | MALE | I'M GOOD WITH MAKING CONTINUOUS EFFORTS. | I'LL GET A CERTIFICATION OF A REGISTERED SMALLER ENTERPRISE CONSULTANT. |
| U05 | NORIKO MATSUSHITA | 30 | FEMALE | I HAVE THE ABILITY TO CONCENTRATE. | I'M ASPIRING TO BE A NURSE. |
| U06 | GORO MATSUMOTO | 24 | MALE | I CAN THINK DEEPLY. | I WANT TO BE A LAWYER. |

FIG. 4

| LEARNING MATERIAL ID | TITLE | DIFFICULTY | ASSUMED READER | TIME REQUIRED FOR LEARNING | LEARNING TEXT |
|---|---|---|---|---|---|
| D01 | BOOK TO BE READ BY ONE WHO WANTS TO BE A LAWYER | ★★★★ | ONE WHO WANTS TO BE A LAWYER | SIX MONTHS | THIS DOCUMENT IS A BOOK TO BE READ BY ONE WHO WANTS TO BE A LAWYER.... |
| D02 | BOOK TO BE READ BY ONE WHO WANTS TO BE AN ACCOUNTANT | ★★★ | ONE WHO WANTS TO BE AN ACCOUNTANT | SIX MONTHS | THIS DOCUMENT IS A BOOK TO BE READ BY ONE WHO WANTS TO BE AN ACCOUNTANT.... |
| D03 | BOOK TO BE READ BY ONE WHO WANTS TO BE A TAX ACCOUNTANT | ★★ | ONE WHO WANTS TO BE A TAX ACCOUNTANT | FOUR MONTHS | THIS DOCUMENT IS A BOOK TO BE READ BY ONE WHO WANTS TO BE A TAX ACCOUNTANT.... |
| D04 | PREPARATION BOOK FOR THE EXAM TO BECOME A REGISTERED SMALLER ENTERPRISE CONSULTANT | ★★★ | ONE WHO WANTS TO PASS AN EXAMINATION FOR A REGISTERED SMALLER ENTERPRISE CONSULTANT | THREE MONTHS | THIS DOCUMENT IS A BOOK TO BE READ BY ONE WHO WANTS TO BE A REGISTERED SMALLER ENTERPRISE CONSULTANT.... |
| D05 | BOOK TO BE READ BY ONE WHO WANTS TO BE A NURSE | ★★ | ONE WHO WANTS TO BE A NURSE | SIX MONTHS | THIS DOCUMENT IS A BOOK TO BE READ BY ONE WHO WANTS TO BE A NURSE.... |
| D06 | BOOK TO BE READ NEXT BY ONE WHO WANTS TO BE A LAWYER | ★★★★ | ONE WHO WANTS TO BE A LAWYER | SIX MONTHS | THIS DOCUMENT IS A BOOK TO BE READ NEXT BY ONE WHO WANTS TO BE A LAWYER.... |
| D07 | BOOK TO BE READ NEXT BY ONE WHO WANTS TO BE A LAWYER (FOR REVIEW) | ★★★ | ONE WHO WANTS TO BE A LAWYER | SIX MONTHS | THIS DOCUMENT IS A BOOK TO BE READ NEXT BY ONE WHO WANTS TO BE A LAWYER.... IF THERE IS ANYTHING IN D01 YOU ARE UNCLEAR ON, PLEASE READ THIS DOCUMENT. |
| D08 | BOOK TO BE READ NEXT BY ONE WHO WANTS TO BE A LAWYER (ADVANCED) | ★★★★ | ONE WHO WANTS TO BE A LAWYER | SIX MONTHS | THIS DOCUMENT IS A BOOK TO BE READ NEXT BY ONE WHO WANTS TO BE A LAWYER.... IF YOU FEEL D01 IS MISSING SOMETHING, PLEASE READ THIS DOCUMENT. |

FIG. 5

| LEARNER ID | LEARNING MATERIAL ID | CONCENTRATION DEGREE LOG |
|---|---|---|
| U01 | D01 | 90 |
| U01 | D02 | 50 |
| U02 | D02 | 85 |
| U02 | D03 | 40 |
| U03 | D03 | 95 |
| U03 | D04 | 30 |
| U04 | D04 | 80 |
| U04 | D05 | 20 |
| U05 | D05 | 100 |
| U05 | D01 | 10 |

FIG. 6

| LEARNER ID | LEARNING MATERIAL ID | COMPREHENSION LOG |
|---|---|---|
| U01 | D01 | 90 |
| U01 | D02 | 50 |
| U02 | D02 | 85 |
| U02 | D03 | 40 |
| U03 | D03 | 95 |
| U03 | D04 | 30 |
| U04 | D04 | 80 |
| U04 | D05 | 20 |
| U05 | D05 | 100 |
| U05 | D01 | 10 |

FIG. 7

| LEARNER ID | LEARNING MATERIAL ID | SCORE OF PREDICTED CONCENTRATION DEGREE |
|---|---|---|
| U06 | D01 | 90 |
| U06 | D02 | 10 |
| U06 | D03 | 30 |
| U06 | D04 | 20 |
| U06 | D05 | 40 |
| U06 | D06 | 80 |

| LEARNING MATERIAL ID | NEXT LEARNING MATERIAL ID | | | |
|---|---|---|---|---|
| | (1) best fit | (2) too much | (3) too easy | (4) less motivated |
| D01 | D06 | D07 | D08 | NULL |
| D02 | ... | ... | ... | ... |
| D03 | ... | ... | ... | ... |
| D04 | ... | ... | ... | ... |
| D05 | ... | ... | ... | ... |

LEARNING MATERIAL RECOMMENDATION METHOD, LEARNING MATERIAL RECOMMENDATION DEVICE, AND LEARNING MATERIAL RECOMMENDATION PROGRAM

This application is a National Stage Entry of PCT/JP2018/002551 filed on Jan. 26, 2018, which claims priority from Japanese Patent Application 2017-048776 filed on Mar. 14, 2017, the contents of all of which are incorporated herein by reference, in their entirety.

TECHNICAL FIELD

The present invention relates to a learning material recommendation method for recommending a learning material that should be learned next by a learner.

BACKGROUND ART

Active learning refers to an approach where learners are actively engaged in learning. According to the glossary of the Ministry of Education, Culture, Sports, Science and Technology (Japan), active learning is "a collective term for teaching and learning methods which incorporate active participation of students in a study process, rather than the method of education in a form of lecture given unilaterally by a teacher. By letting students study actively, this methodology is aimed at cultivating generic skills, such as cognitive, ethical and social capabilities, cultural refinement, knowledge, and experience. Examples of active learning include discovery learning, problem solving learning, experiential learning, and investigative learning. Group discussions, debate, and group workshops in the classroom are also effective methods of active learning."

Active learning has been provided in elementary schools, junior and senior high schools, private tutoring schools, preparatory schools, and so on. In recent years, web services called "Massive Open Online Courses (MOOCs)" have also been provided. MOOCs include, for example, "gacco" (registered trademark) provided by DOCOMO gacco, Inc., and "Studysapuri" (registered trademark) provided by Recruit Marketing Partners Co., Ltd. An approach to provide active learning in the form of web service is called "EdTech" (Education×Technology). EdTech is expected as a seed of innovation that can dramatically increase the productivity in the education-related industries.

CITATION LIST

Patent Literatures

PTL 1: WO 2014/141414
PTL 2: U.S. Pat. No. 8,341,095

Non Patent Literatures

NPL 1: Seiji Takeda et al.: "Method of Estimating Concentration in Exercise Game by Combining Multiple Physiological Indices", The 29th Annual Conference of the Japanese Society for Artificial Intelligence, 2015
NPL 2: D. Bespalov et al.: "Sentiment Classification with Supervised Sequence Embedding", Springer-Verlag, 2012

SUMMARY OF INVENTION

Technical Problem

In active learning, generally, an optimal learning material that should be learned next by a learner is recommended in accordance with the learner's current "comprehension", in order for a "goal (abilities, technique, knowledge that the learner wishes to acquire)" set by the learner to be achieved by the most direct way. Further, generally, the learner's "comprehension" is measured quantitatively by confirmation test and/or questionnaire after digestion of a learning material. However, there are cases where an optimal learning material cannot be recommended to a learner by simply measuring the learner's "comprehension", as follows.

Case 1: When the learner's comprehension is high, it is undistinguishable whether the learning material is easy or optimal.

Case 2: When the learner's comprehension is low, it is undistinguishable whether the learning material is difficult or the learner's motivation to learn is low.

A technique of estimating the learner's "comprehension" (progress of learning) is described, for example, in PTL 1. According to this technique, the comprehension is judged from the learner's pattern on the learning material (specifically, whether the writing is being performed in units of letters, words, or clauses, for example). The learner's concentration degree is also judged on the basis of the degree of learner's synchronization to the assignment.

However, with the technique described in PTL 1, the judgment result is fed back only to the teacher. The concept of feeding the judgment result back to the learner does not exist in the technique described in PTL 1.

It is an object of the present invention to recommend a learning material that should be learned next by a learner, on the basis of the learner's comprehension and concentration degree.

Solution to Problem

A learning material recommendation method according to the present invention estimates a concentration degree indicating the degree of concentration of a learner on a learning material, on the basis of learner data including a feature related to the learner and learning material data including a feature related to the learning material, and selects one from among next learning material candidates associated with the learning material, on the basis of a learning state that is specified on the basis of the concentration degree and a comprehension of the learning material by the learner.

A learning material recommendation device according to the present invention includes: estimation means for estimating a concentration degree indicating the degree of concentration of a learner on a learning material, on the basis of learner data including a feature related to the learner and learning material data including a feature related to the learning material; and learning material selection means for selecting one from among next learning material candidates associated with the learning material, on the basis of a learning state that is specified on the basis of the concentration degree and a comprehension of the learning material by the learner.

A learning material recommendation program according to the present invention causes a computer to perform: estimation processing of estimating a concentration degree indicating the degree of concentration of a learner on a learning material, on the basis of learner data including a feature related to the learner and learning material data including a feature related to the learning material; and learning material selection processing of selecting one from among next learning material candidates associated with the learning material, on the basis of a learning state that is specified on the basis of the concentration degree and a comprehension of the learning material by the learner.

A learning material recommendation program stored in a computer readable recording medium according to the present invention performs, when executed by a processor, estimation processing of estimating a concentration degree indicating the degree of concentration of a learner on a learning material, on the basis of learner data including a feature related to the learner and learning material data including a feature related to the learning material, and learning material selection processing of selecting one from among next learning material candidates associated with the learning material, on the basis of a learning state that is specified on the basis of the concentration degree and a comprehension of the learning material by the learner.

Advantageous Effects of Invention

According to the present invention, it is possible to recommend a learning material that should be learned next by a learner, on the basis of the learner's comprehension and concentration degree.

BRIEF DESCRIPTION OF DRAWINGS

FIG. 1 is a diagram illustrating the main point of the present invention.
FIG. 3 is a diagram illustrating an example of learner data.
FIG. 4 is a diagram illustrating an example of learning material data.
FIG. 5 is a diagram illustrating an example of concentration degree log.
FIG. 6 is a diagram illustrating an example of comprehension log.
FIG. 7 is a diagram illustrating an example of score of predicted concentration degree.

DESCRIPTION OF EMBODIMENT

Figure 2:
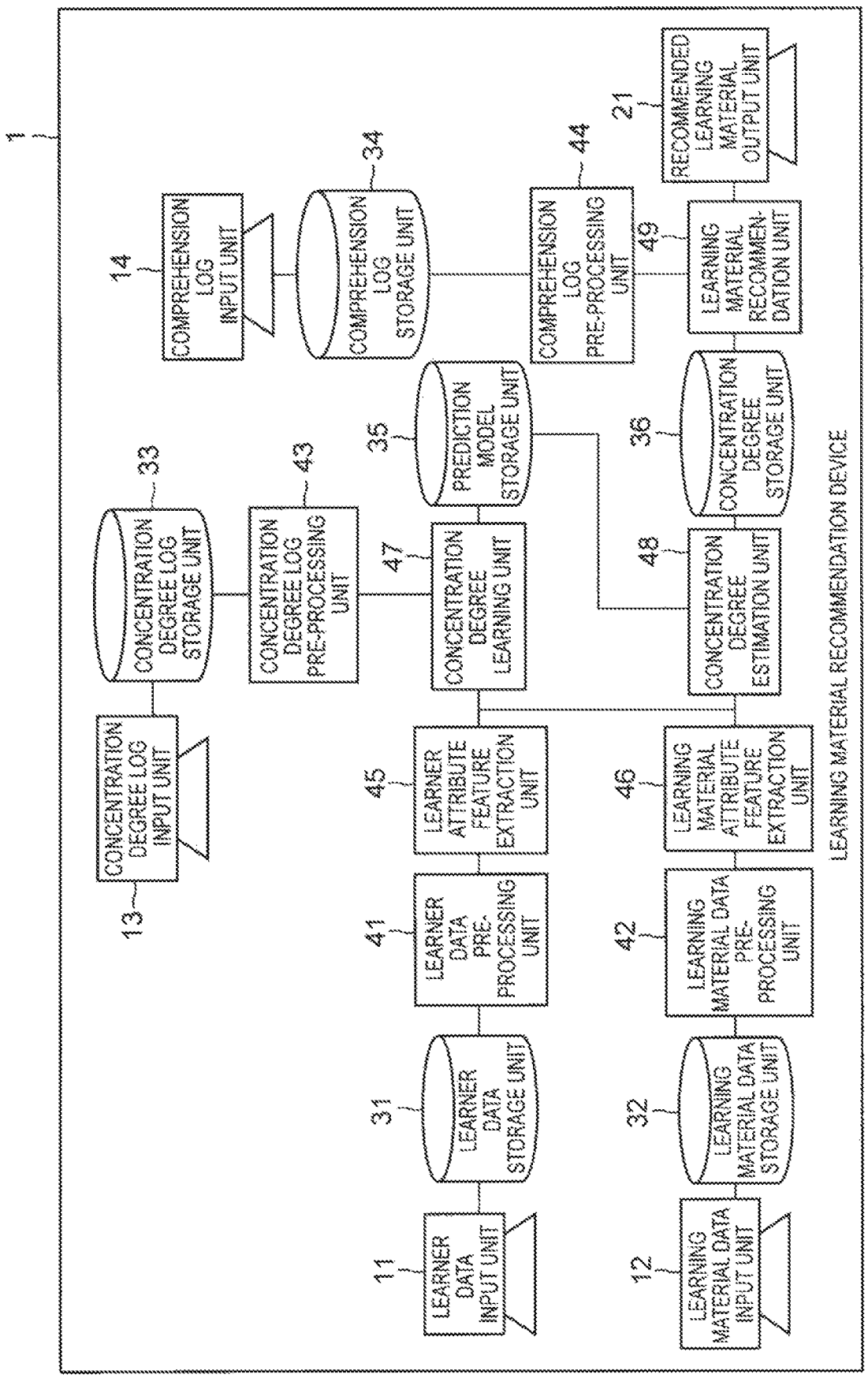
FIG. 2 is a block diagram showing a first embodiment of a learning material recommendation device according to the present invention.

FIG. 1 is a diagram illustrating the main point of the present invention.

As a solution to the problem in Case 1 above, the learning material recommendation device determines that the recommended learning material is optimal when the learner's comprehension is high and the learner's growth is high (see '(1) best fit' in FIG. 1). When the learner's comprehension is high and the learner's growth is low, the learning material recommendation device determines that the recommended learning material is easy. The learning material recommendation device then corrects the direction of the learning so as to increase the difficulty of the learning material (see '(2) too easy' in FIG. 1). That is, the device makes adjustment in the learning process.

As a solution to the problem in Case 2 above, the learning material recommendation device determines that the recommended learning material is difficult when the learner's comprehension is low and the learner's growth is high. The learning material recommendation device then makes adjustment in the learning process so as to decrease the difficulty of the learning material (see '(3) too much' in FIG. 1). When the learner's comprehension is low and the learner's growth is low, the learning material recommendation device determines that the learner's motivation to learn is low. The learning material recommendation device then makes adjustment in the learning process so as to improve the learner's motivation to learn (see '(4) less motivated' in FIG. 1).

It would be difficult to directly measure the learner's "growth" before and after learning the recommended learning material. Thus, in the following embodiments, it is assumed that there is a strong correlation between the "concentration degree" indicating the degree of concentration of the learner on the learning material during learning and the learner's "growth" before and after the learning. The learning material recommendation device estimates the learner's "concentration degree" during learning from the learner's behavioral data during the learning (for example, biological data measured by a wearable terminal, terminal operation log data measured by using a web application), and estimates the learner's "growth" before and after the learning from the "concentration degree".

There are various methods for estimating the "concentration degree" from behavioral data. By way of example, NPL 1 above describes a method of estimating the concentration degree of a human being during exercise by using two statistics called Skin Conductance Response (SCR) variation and Low Frequency (LF)/High Frequency (HF) variation.

In the following embodiments, the learner's "concentration degree" during learning is estimated by modeling, by machine learning (deep learning or the like), the correlation among data on the learner's behaviors during learning (learner attribute data), data on the learning material being learned (learning material attribute data), and the learner's concentration degree (correct answer data) during learning, which is self-reported by the learner. The learner's "growth" during learning is computed by applying a regression model (with a correlation coefficient assumed to be 1) to the learner's "concentration degree" during learning. It should be noted that the correlation coefficient other than "1" may be used.

In the following embodiments, methods of correcting the learning process required in the cases excluding (1) best fit in FIG. 1 (i.e. (2) too easy, (3) too much, (4) less motivated) will be presented as well.

Embodiment 1

FIG. 2 is a block diagram showing a first embodiment of the learning material recommendation device according to the present invention.

The learning material recommendation device 1 shown in FIG. 1 includes: a learner data input unit 11, a learning material data input unit 12, a concentration degree log input unit 13, a comprehension log input unit 14, a recommended learning material output unit 21, a learner data storage unit 31, a learning material data storage unit 32, a concentration degree log storage unit 33, a comprehension log storage unit 34, a prediction model storage unit 35, a concentration degree storage unit 36, a learner data pre-processing unit 41, a learning material data pre-processing unit 42, a concentration degree log pre-processing unit 43, a comprehension log pre-processing unit 44, a learner attribute feature extraction unit 45, a learning material attribute feature extraction unit 46, a concentration degree learning unit 47, a concentration degree estimation unit 48, and a learning material recommendation unit 49.

The learner data input unit 11 writes input learner data into the learner data storage unit 31. The learning material data input unit 12 writes input learning material data into the learning material data storage unit 32. The concentration degree log input unit 13 writes an input concentration degree log into the concentration degree log storage unit 33. The comprehension log input unit 14 writes an input comprehension log into the comprehension log storage unit 34.

The recommended learning material output unit 21 outputs a result of calculation by the learning material recommendation unit 49 (which corresponds to the learning material that should be learned next by the learner). For example, the recommended learning material output unit 21 displays information that can specify the learning material that should be learned next (the recommended learning material) on the display unit, or sends the information to another terminal (for example, a user terminal).

The learner data storage unit 31 preserves learner data. The learner data is attribute data related to the learner. Examples of the learner data include demographic data such as name, age, gender, etc., learning history data, social network service (SNS) data related to the learner (self-introduction, learning goal, etc.), and learner's behavioral data during learning (biological data measured by a wearable terminal, terminal operation log data measured by using a web application, etc.).

FIG. 3 is a diagram illustrating an example of the learner data stored in the learner data storage unit 31. In the example shown in FIG. 3, the learner data includes data on name, age, gender, self-introduction, and learning target corresponding to a learner ID.

The learning material data storage unit 32 preserves learning material data. The learning material data is attribute data related to the learning material. The learning material data include, for example, meta-information such as title, difficulty, assumed learner, time required for learning, etc., and content information such as text, image, video, sound, etc. for learning.

FIG. 4 is a diagram illustrating an example of the learning material data stored in the learning material data storage unit 32. In the example shown in FIG. 4, the learning material data includes title, difficulty, assumed reader, time required for learning, and learning text corresponding to a learning material ID.

The concentration degree log storage unit 33 preserves log data related to the concentration degree (concentration degree log). The concentration degree log indicates the learner's concentration degree while learning the learning material, for example, which is an actual value self-marked by the learner. For example, the concentration degree is indicated by a score in the range of [0, 100].

FIG. 5 is a diagram illustrating an example of the concentration degree log stored in the concentration degree log storage unit 33. In the example shown in FIG. 5, the concentration degree log is stored in association with a learner ID and a learning material ID.

The comprehension log storage unit 34 preserves log data related to the comprehension (comprehension log). The comprehension log indicates the learner's comprehension when he/she has studied the learning material, for example, which is an actual value marked in a confirmation test taken by the learner. For example, the comprehension is indicated by a score in the range of [0, 100].

FIG. 6 is a diagram illustrating an example of the comprehension log stored in the comprehension log storage unit 34. In the example shown in FIG. 6, the comprehension log is stored in association with a learner ID and a learning material ID.

The prediction model storage unit 35 preserves a prediction model generated by the concentration degree learning unit 47.

The concentration degree storage unit 36 preserves a concentration degree output by the concentration degree estimation unit 48, i.e., the concentration degree estimated (hereinafter, referred to as "score of predicted concentration degree") when the learner studies the learning material.

FIG. 7 is a diagram illustrating an example of the score of the predicted concentration degree stored in the concentration degree storage unit 36. In the example shown in FIG. 7, the score of the predicted concentration degree is stored in association with a learner ID and a learning material ID.

The learner data pre-processing unit 41 refers to the learner data storage unit 31 to read an attribute record related to a learner (hereinafter, referred to as "learner attribute record"). The learner data pre-processing unit 41 generates a learner attribute vector from the attribute information related to the learner which is stored in the learner attribute record.

The learning material data pre-processing unit 42 refers to the learning material data storage unit 32 to read an attribute record related to a learning material (hereinafter, referred to as "learning material attribute record"). The learning material data pre-processing unit 42 generates a learning material attribute vector from the attribute information related to the learning material which is stored in the learning material attribute record.

The concentration degree log pre-processing unit 43 refers to the concentration degree log storage unit 33 to read log data related to a concentration degree. The concentration degree log pre-processing unit 43 converts the log data into a data format that can be processed by the concentration degree learning unit 47, to generate an actual concentration degree sore. For example, the concentration degree log pre-processing unit 43 uses a threshold value to binarize the score value in the range of [0, 100], to obtain the actual concentration degree score.

The comprehension log pre-processing unit 44 refers to the comprehension log storage unit 34 to read log data related to a comprehension. The comprehension log pre-processing unit 44 converts the log data into a data format that can be processed by the learning material recommendation unit 49, to generate an actual comprehension score. For example, the comprehension log pre-processing unit 44 uses a threshold value to binarize the score value in the range of [0, 100], to obtain the actual comprehension score.

The learner attribute feature extraction unit 45 performs feature extraction from the learner attribute vector generated by the learner data pre-processing unit 41, to generate a learner feature vector. The learning material attribute feature extraction unit 46 performs feature extraction from the learning material attribute vector generated by the learning material data pre-processing unit 42, to generate a learning material feature vector.

The concentration degree learning unit 47 uses the learner feature vector generated by the learner attribute feature extraction unit 45, the learning material feature vector generated by the learning material attribute feature extraction unit 46, and the actual concentration degree score generated by the concentration degree log pre-processing unit 43, to generate a learning data set (data set of records each having a data combination of <learner feature vector, learning material feature vector, actual concentration degree score>). The concentration degree learning unit 47 then generates a prediction model by machine-learning the relationship among the learner feature vector, the learning material feature vector, and the actual concentration degree score.

The concentration degree estimation unit 48 predicts (estimates) the learner's concentration degree. Specifically, the concentration degree estimation unit 48 uses the learner feature vector generated by the learner attribute feature extraction unit 45 and the learning material feature vector generated by the learning material attribute feature extraction unit 46, to generate a prediction data set (data set of records each having a data combination of <learner feature vector, learning material feature vector>). The concentration degree estimation unit 48 then applies the prediction model stored in the prediction model storage unit 35, to generate a score value in the range of [0, 100] as a score of the predicted concentration degree for the prediction data.

The learning material recommendation unit 49 refers to the concentration degree storage unit 36 to read a score of the predicted concentration degree for a <learner, learning material> pair. The learning material recommendation unit 49 inputs the actual comprehension score for that pair from the comprehension log pre-processing unit 44, and performs calculation for recommending a learning material that should be learned next by the learner. The learning material recommendation unit 49 sends the result of calculation to the recommended learning material output unit 21.

As the learning material recommendation device 1, a personal computer, for example, can be used. However, a server or other various kinds of devices may be used as the learning material recommendation device 1. In the present embodiment, it is assumed that a server is used as the learning material recommendation device 1.

Therefore, the learner data pre-processing unit 41, the learning material data pre-processing unit 42, the concentration degree log pre-processing unit 43, the comprehension log pre-processing unit 44, the learner attribute feature extraction unit 45, the learning material attribute feature extraction unit 46, the concentration degree learning unit 47, the concentration degree estimation unit 48, and the learning material recommendation unit 49 can be implemented by a central processing unit (CPU) that executes processing on the basis of a program stored in a program storage unit in the server.

Further, the learner data storage unit 31, the learning material data storage unit 32, the concentration degree log storage unit 33, the comprehension log storage unit 34, the prediction model storage unit 35, and the concentration degree storage unit 36 are implemented by a storage unit in the server.

While the learning material recommendation device 1 including the learner data input unit 11, the learning material data input unit 12, the concentration degree log input unit 13, the comprehension log input unit 14, and the recommended learning material output unit 21 is shown in FIG. 2, input sections and display sections of these units may be implemented, for example, by one or more terminals (personal computers or the like) connected to the server (directly or via a communication network). In such a case, the server used as the learning material recommendation device 1 implements the portion excluding the learner data input unit 11, the learning material data input unit 12, the concentration degree log input unit 13, the comprehension log input unit 14, and the recommended learning material output unit 21, or the portion excluding the input sections (keyboard or the like) and the display sections (display or the like) in the learner data input unit 11, the learning material data input unit 12, the concentration degree log input unit 13, the comprehension log input unit 14, and the recommended learning material output unit 21.

A description will now be given of an operation of the learning material recommendation device 1.

The operation of the learning material recommendation device 1 includes:

(A) a concentration degree learning step,
(B) a concentration degree prediction step, and
(C) a learning material recommendation step.

In the (A) concentration degree learning step, the concentration degree learning unit 47 models, by machine learning, the relationship among the learner feature vector generated by the learner attribute feature extraction unit 45, the learning material feature vector generated by the learning material attribute feature extraction unit 46, and the actual concentration degree score generated by the concentration degree log pre-processing unit 43, to generate a prediction model. The concentration degree learning unit 47 stores the prediction model in the prediction model storage unit 35.

In the (B) concentration degree prediction step, the concentration degree estimation unit 48 applies the prediction model stored in the prediction model storage unit 35 to the learner feature vector generated by the learner attribute feature extraction unit 45 (learner feature vector related to the target learner) and the learning material feature vector generated by the learning material attribute feature extraction unit 46 (material feature vector related to the learning material that the target learner is currently using), to calculate a predicted concentration degree score when the learner studies the learning material. The concentration degree estimation unit 48 stores the score of the predicted concentration degree in the concentration degree storage unit 36.

In the (C) learning material recommendation step, the learning material recommendation unit 49 determines a learning material that should be learned next by the learner, from the score of the predicted concentration degree for the <learner, learning material> pair about the learner and the learning material, stored in the concentration degree storage unit 36, and the actual comprehension score for that pair, input from the comprehension log pre-processing unit 44. The learning material recommendation unit 49 outputs the result of determination to the recommended learning material output unit 21.

Figure 8:
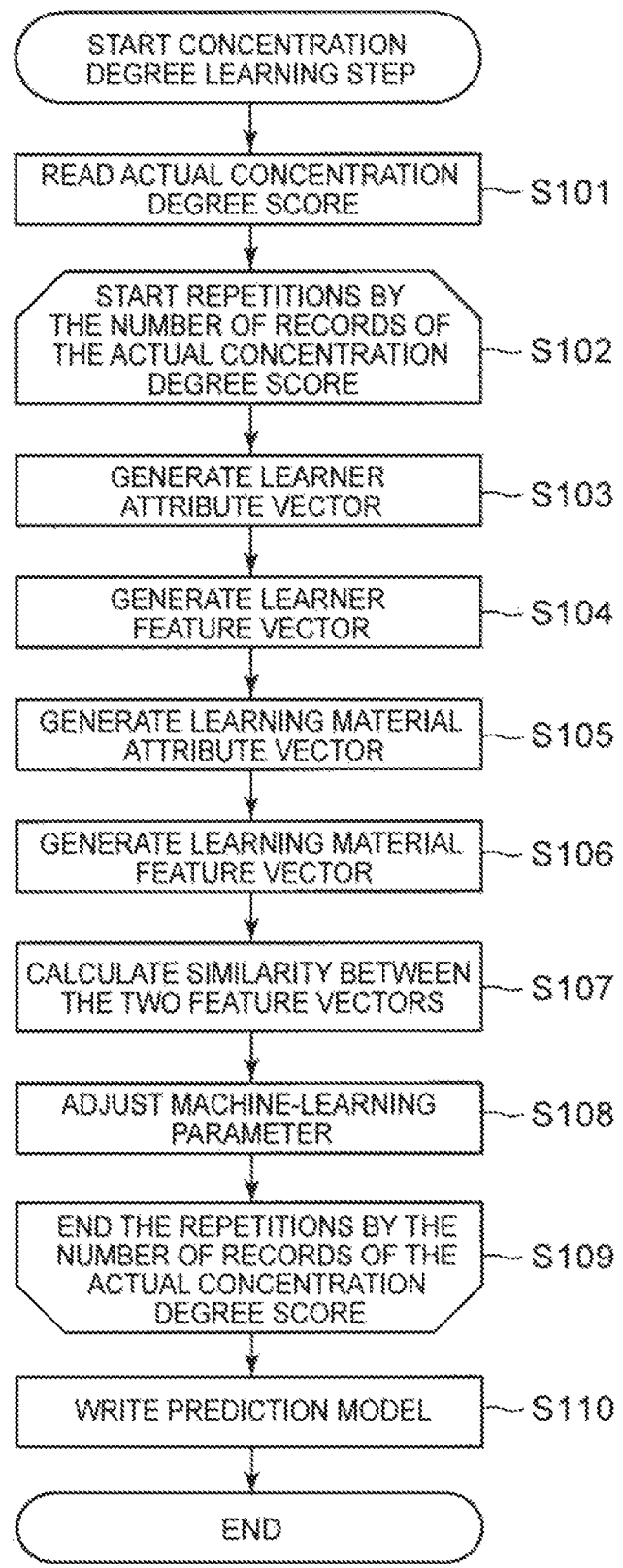
FIG. 8 is a flowchart illustrating an operation of the learning material recommendation device in (A) concentration degree learning step.

The operation of the learning material recommendation device 1 in the (A) concentration degree learning step will be described in more detail below with reference to the flowchart in FIG. 8.

In step S101, the concentration degree learning unit 47 reads an actual concentration degree score via the concentration degree log pre-processing unit 43.

That is, the concentration degree learning unit 47 reads all the data combinations of <learner ID, learning material ID, actual concentration degree score> stored in the concentration degree log storage unit 33 via the concentration degree log pre-processing unit 43. At this time, the concentration degree log pre-processing unit 43 performs appropriate pre-processing on the concentration degree log (real value in the range of [0, 100]) stored in the concentration degree log storage unit 33, to generate the actual concentration degree score from the concentration degree log.

As the pre-processing, for example, the concentration degree log pre-processing unit 43 may binarize the concentration degree log (to 0 or 1) on the basis of a threshold value set in advance. The concentration degree log pre-processing unit 43 may round the value at regular intervals (to "0, 10, 20, . . . " by way of example). The concentration degree log pre-processing unit 43 may use the value of the concentration degree log (0, 1, 2, . . . ) without modification.

The concentration degree learning unit 47 repeats the processing in steps S103 to S108 by the number of records of the actual concentration degree score read in the processing in step S101 (steps S102, S109).

In step S103, the concentration degree learning unit 47 generates a learner attribute vector via the learner data pre-processing unit 41.

Specifically, the concentration degree learning unit 47 instructs the learner data pre-processing unit 41 to read learner data that matches the learner ID of the actual concentration degree score read in the processing in step S101. The learner data pre-processing unit 41 reads a record matching the condition from the learner data storage unit 31, and converts the record into a vector format to generate a learner attribute vector.

Vectorization (digitizing) of the learner data is performed for example as follows.

As to the numerical values and categorical variables such as age, gender, and the like, the concentration degree learning unit 47 sets the applicable code to 1, and the inapplicable code to 0.

As to the text variables such as self-introduction, learning target, and the like, the concentration degree learning unit 47 divides the text into words (by morphological analysis). The concentration degree learning unit 47 counts the appearance frequencies of the words, and sets the words as vector elements and the frequencies as vector values. The frequency may be counted in units of two to five words instead of one word. The optimal number of words depends on the number of learners as learning objects and the text volume. Part of the learning object data is set aside from the learning object for use in testing, and the test is conducted using that data to verify the accuracy. By performing such verification by changing the number of words, an optimal number of words can be determined. Further, the words that appear frequently in all documents, such as particles, are excluded, for example, to restrict the words the frequency of which is counted, so that vectorization (digitizing) is made to show the feature of the text, i.e. the feature of the person who has created the text.

It should be noted that the text the learner has posted on a Web site or SNS can also be converted into data representing a feature of the user. Recently, learners often write about things they have an interest, on an SNS, blog, etc. Thus, the concentration degree learning unit 47 can use such information to generate a vector including a feature of the learner (for digitizing). For example, the concentration degree learning unit 47 uses a similar technique as the above-described technique of quantifying the text. That is, the concentration degree learning unit 47 parses the uniform resource locator (URL) accessed, counts the frequency or staying time, divides the hypertext transfer protocol (HTTP) document specified by the URL into words and counts them, to thereby vectorize (quantify) the Web access history.

Further, the concentration degree learning unit 47 may measure the learner's biological data during learning (time-series data on amount of sweating, eye movement, heart rate, blood pressure, electromyogram, etc.) by a wearable sensor or the like, and add the biological data to the feature of the learner. In this case, the concentration degree learning unit 47 may convert the time-series data into spatial data by using a well-known technique such as fast Fourier transform (FFT).

In step S104, the concentration degree learning unit 47 generates a learner feature vector.

That is, the concentration degree learning unit 47 instructs the learner attribute feature extraction unit 45 to read the learner attribute vector generated in the processing in step S103. The learner attribute feature extraction unit 45 performs feature extraction from the learner attribute vector to generate a learner feature vector.

In general, the learner attribute vector generated in the processing in step S103 is data having a very large vector length. It would be difficult to apply the data as it is to the subsequent learning and prediction. Therefore, the learner attribute feature extraction unit 45 selects only the distinctive items to generate a compressed vector.

A feature vector can be generated using any known method, which may be the method described in NPL 2 above, for example. While NPL 2 discloses an automatic processing mechanism, important vector elements may be manually analyzed by principal component analysis or the like, and the vector elements may be selected to generate a feature vector.

In step S105, the concentration degree learning unit 47 generates a learning material attribute vector.

That is, the concentration degree learning unit 47 instructs the learning material data pre-processing unit 42 to read learning material data that matches the learning material ID of the actual concentration degree score read in the processing in step S101. The learning material data pre-processing unit 42 reads a record matching the condition from the learning material data storage unit 32, and converts the record into a vector format, to generate a learning material attribute vector. It should be noted that the learning material data can be vectorized (quantified) using a similar method as the vectorization method in the processing in step S103.

In step S106, the concentration degree learning unit 47 generates a learning material feature vector.

That is, the concentration degree learning unit 47 instructs the learning material attribute feature extraction unit 46 to read the learning material attribute vector generated in the processing in step S105. The learning material attribute feature extraction unit 46 performs feature extraction from the learning material attribute vector to generate a learning material feature vector. It should be noted that the feature extraction from the learning material attribute vector can be performed using a similar method (known technique or the like) as that used for the feature extraction in the processing in step S104.

In step S107, the concentration degree learning unit 47 calculates similarity between the two feature vectors.

That is, the concentration degree learning unit 47 calculates cosine similarity between the learner feature vector generated in the processing in step S104 and the learning material feature vector generated in the processing in step S106. In the present embodiment, the cosine similarity is illustrated as a metric for measuring the similarity between two vectors. However, an arbitrary norm (L1 norm, L2 norm, etc.) can be used instead.

In step S108, the concentration degree learning unit 47 adjusts a machine-learning parameter.

That is, the concentration degree learning unit 47 uses the similarity calculated in the processing in step S107 and the actual concentration degree score acquired in the processing in step S101, to adjust the machine-learning parameter as appropriate.

It should be noted that as the machine-learning algorithm, supervised semantic indexing (SSI; see PTL 2, for example) may be used which is a technique of supervised machine-learning algorithm. Alternatively, general machine-learning techniques may be combined. For example, a support vector machine, neural network, and Bayes classifier are widely known.

For example, SSI uses a function form of two inputs (x, y) and one output (s). Other techniques available include: rule-based techniques (such as manually creating a rule associating an output (s) with inputs (x, y)); statistics-based techniques (such as creating a synthetic variable (z) by merging inputs (x, y), and converting into a problem of s=f(z) and applying multiple regression analysis or the like); and learning-based techniques (such as creating a synthetic variable (z) by merging inputs (x, y), and converting into a problem of s=f(z) and applying logistic regression, support vector machine (SVM), or the like).

In step S110, the concentration degree learning unit 47 performs writing of a prediction model.

That is, the concentration degree learning unit 47 writes the machine-learning parameter adjusted appropriately in the processing in step S108, into the prediction model storage unit 35.

Figure 9:
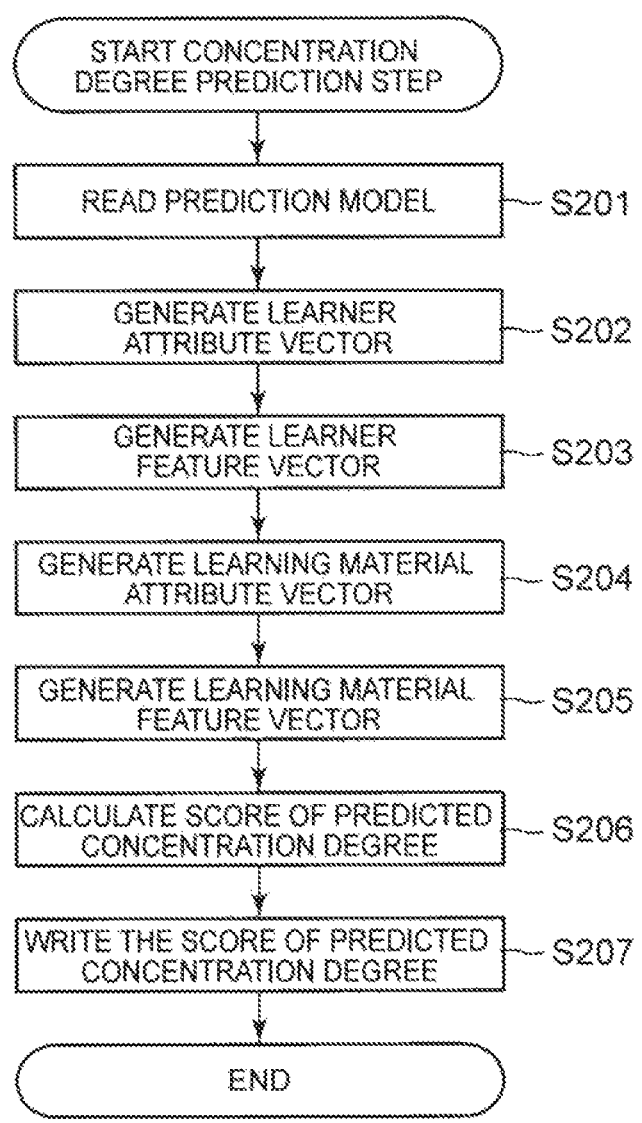
FIG. 9 is a flowchart illustrating an operation of the learning material recommendation device in (B) concentration degree prediction step.

The operation of the learning material recommendation device 1 in the (B) concentration degree prediction step will now be described in more detail with reference to the flowchart in FIG. 9.

In step S201, the concentration degree estimation unit 48 performs reading of a prediction model.

That is, the concentration degree estimation unit 48 reads from the prediction model storage unit 35 the adjusted machine-learning parameter written in the processing in step S110.

In step S202, the concentration degree estimation unit 48 generates a learner attribute vector.

That is, the concentration degree estimation unit 48 instructs the learner data pre-processing unit 41 to input a learner ID as an object of estimation of the concentration degree from the learner data input unit 11 and to read learner data that matches the learner ID. The learner data pre-processing unit 41 reads a record matching the condition from the learner data storage unit 31. The learner data pre-processing unit 41 converts the record into a vector format, to generate a learner attribute vector.

In step S203, the concentration degree estimation unit 48 generates a learner feature vector.

That is, the concentration degree estimation unit 48 instructs the learner attribute feature extraction unit 45 to read the learner attribute vector generated in step S202. The learner attribute feature extraction unit 45 performs feature extraction from the learner attribute vector to generate a learner feature vector. Feature extraction from the learner attribute vector can be performed in a similar manner as in the processing in step S104.

In step S204, the concentration degree estimation unit 48 generates a learning material attribute vector.

That is, the concentration degree estimation unit 48 instructs the learning material data pre-processing unit 42 to receive a learning material ID as an object of estimation of the concentration degree from the learning material data input unit 12 and to read learning material data that matches the learning material ID. The learning material data pre-processing unit 42 reads a record matching the condition from the learning material data storage unit 32. The learning material data pre-processing unit 42 converts the record into a vector format, to generate a learning material attribute vector. Vectorization (digitizing) of the learning material data can be performed using a similar method as the vectorization method in the processing in step S103.

In step S205, the concentration degree estimation unit 48 generates a learning material feature vector.

That is, the concentration degree estimation unit 48 instructs the learning material attribute feature extraction unit 46 to read the learning material attribute vector generated in the processing in step S204. The learning material attribute feature extraction unit 46 performs feature extraction from the learning material attribute vector to generate a learning material feature vector. Feature extraction from the learning material attribute vector can be performed in a similar manner as in the processing in step S104.

In step S206, the concentration degree estimation unit 48 computes a score of the predicted concentration degree.

That is, the concentration degree estimation unit 48 uses the learner feature vector generated in the processing in step S203 and the learning material feature vector generated in the processing in step S205 to calculate a score of the predicted concentration degree when the learner studies the learning material, on the basis of the machine-learning parameter read in the processing in step S201.

The score of the predicted concentration degree is a real value in the range of [0, 100]. By way of example, the score of the predicted concentration degree is a numerical value called probability (certainty, reliability) of a support vector machine known as one of the pattern recognition models.

In step S207, the concentration degree estimation unit 48 performs writing of the score of the predicted concentration degree.

That is, the concentration degree estimation unit 48 writes the score of the predicted concentration degree computed in the processing in step S206 into the concentration degree storage unit 36 in a data format of <learner ID, learning material ID, score of predicted concentration degree>.

It should be noted that the prediction (estimation) of the concentration degree can be formulated as follows.

$$s = f(x, y)$$

x: learner data including a feature related to a learner (input)

y: learning material data including a feature related to a learning material (input)

s: a score of the predicted concentration degree (output)

While two input variables are used in the present embodiment, the number of input variables may be increased. By way of example, as an input variable z other than the input variables x, y, context data representing the circumference situations of the learner is used.

Further, the attributes of the input variables may be increased. For example, regarding the feature related to the learner, data other than the above-described SNS data and biological data may be added to the feature. Further, regarding the feature related to the learning material, besides the above-described content data (content information), bibliographic data or the like may be added to the feature.

The operation of the learning material recommendation device 1 in the (C) learning material recommendation step will now be described in more detail with reference to the flowchart in FIG. 10.

In step S301, the learning material recommendation unit 49 inputs <learner ID, learning material ID> related to the learner as an object of recommendation of a learning material that should be learned next. That is, the learning material recommendation unit 49 inputs the <learner ID, learning material ID> pair, via the learner data input unit 11 and the learning material data input unit 12, for recommending the learning material that should be learned next.

In step S302, the learning material recommendation unit 49 reads a score of the predicted concentration degree for the <learner ID, learning material ID>. That is, the learning material recommendation unit 49 refers to the concentration degree storage unit 36 to read the score of the predicted concentration degree that matches the <learner ID, learning material ID> pair acquired in the processing in step S301.

In step S303, the learning material recommendation unit 49 reads an actual comprehension score for the <learner ID, learning material ID>. That is, the learning material recommendation unit 49 reads, via the comprehension log pre-processing unit 44, the actual comprehension score that matches the <learner ID, learning material ID> pair acquired in the processing in step S301.

In step S304, the learning material recommendation unit 49 calculates a predicted growth score from the score of the predicted concentration degree. That is, the learning material recommendation unit 49 converts the score of the predicted concentration degree for the <learner ID, learning material ID> pair acquired in the processing in step S302 to a predicted growth score.

As explained above, it is assumed that there is a strong correlation between the learner's "concentration degree" during learning and the learner's "growth" before and after the learning. In the present embodiment, by way of example, the estimated, the score of the predicted concentration degree, as it is, is used as the predicted growth score (equivalent to the regression model with the correlation coefficient being 1). It should be noted that the learning material recommendation unit 49 may use a regression model to precisely organize a conversion equation between the score of the predicted concentration degree and the predicted growth score. In such a case, the learner is requested to self-report his/her growth before and after the learning, and the learning material recommendation unit 49 models the correlation of the growth with the score of the predicted concentration degree.

In step S305, the learning material recommendation unit 49 judges the learner's learning state from the predicted growth score and the actual comprehension score. That is, the learning material recommendation unit 49 judges the learner's learning state for the <learner ID, learning material ID> pair from the actual comprehension score acquired in the processing in step S303 and the predicted growth score calculated in the processing in step S304.

The learning state means the progress or achievement of learning with the comprehension and the growth used as indices. In the present embodiment, the learning material recommendation unit 49 uses a judgment table as shown in FIG. 1, for example, when judging the learning state. Each of the actual comprehension score and the predicted growth score is a real value in the range of [0, 100]. The learning material recommendation unit 49 uses a threshold value set in advance, to binarize (classify into high or low) each of the actual comprehension score and the predicted growth score.

The learner's learning state is mapped into one of the following four quadrants.

(1) best fit: the actual comprehension score is high, and the predicted growth score is high.
(2) too easy: the actual comprehension score is high, and the predicted growth score is low.
(3) too much: the actual comprehension score is low, and the predicted growth score is high.
(4) less motivated: the actual comprehension score is low, and the predicted growth score is low.

In step S306, the learning material recommendation unit 49 recommends a learning material that should be learned next, from a learning process table and the learner's learning state.

That is, the learning material recommendation unit 49 recommends a learning material that should be learned next by a learner, from the learner's learning state judged in the processing in step S305 and the learning process table created in advance. The learning process table is a table that sets, for learning materials to be learned by a learner, which learning material should be selected next in accordance with the learner's learning state. The learning process table is stored in advance in a storage unit of the learning material recommendation device 1.

Figures 10, 11:
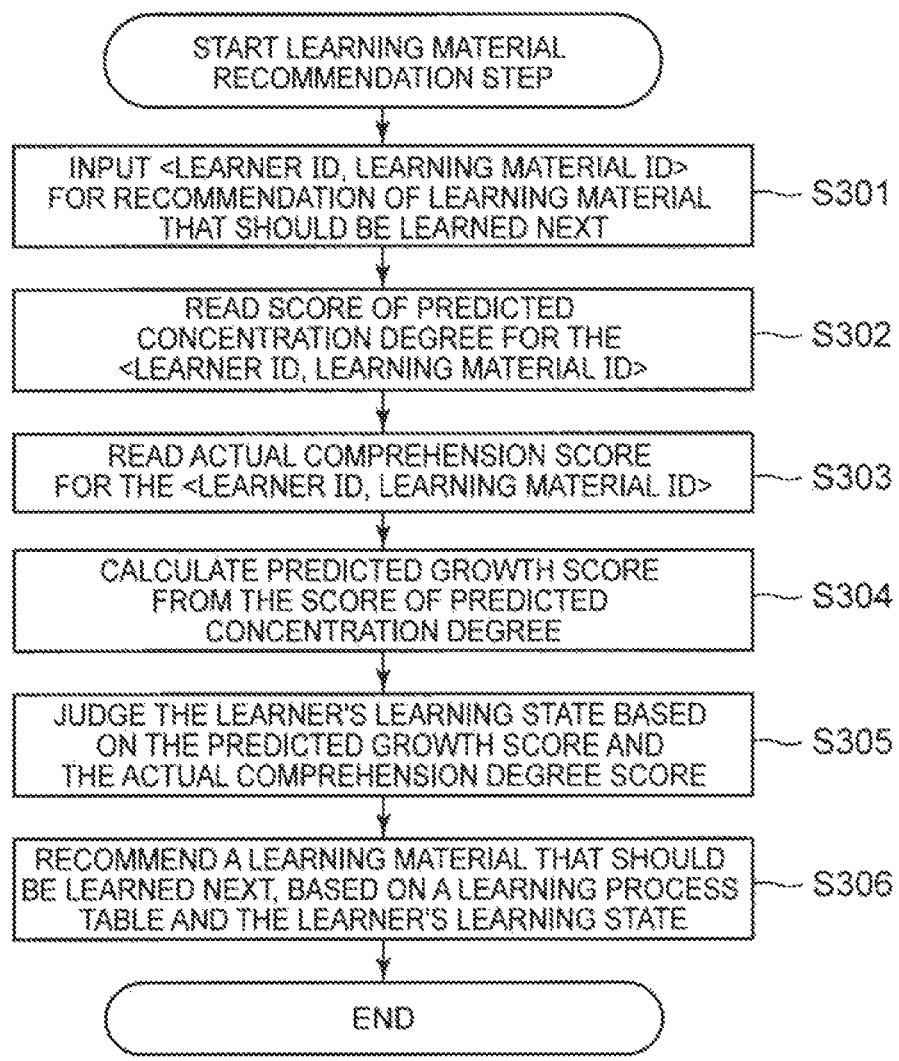
FIG. 10 is a flowchart illustrating an operation of the learning material recommendation device in (C) learning material recommendation step.
FIG. 11 is a diagram illustrating an example of a learning process table.

FIG. 11 is a diagram illustrating an example of the learning process table. The learning process table is a table based on a result of rule-based designing of the learning material that should be learned next, with respect to a combination of <learning material, learner's learning state>.

As described above, in the present embodiment, it is possible to automatically recommend a learning material that should be learned next by a learner, from the learner's comprehension when learning a learning material and the estimated growth of the learner during the learning (based on the concentration degree).

Embodiment 2

In the first embodiment, the three steps of (A) concentration degree learning step, (B) concentration degree prediction step, and (C) learning material recommendation step are all carried out by a single learning material recommendation device 1. However, another embodiment is conceivable in which a prediction model is received via the Internet (for example, received from a distribution sever of a prediction model published on the Internet), so the two steps of (B) concentration degree prediction step and (C) learning material recommendation step alone are carried out, with the (A) concentration degree learning step being omitted.

Figure 12:
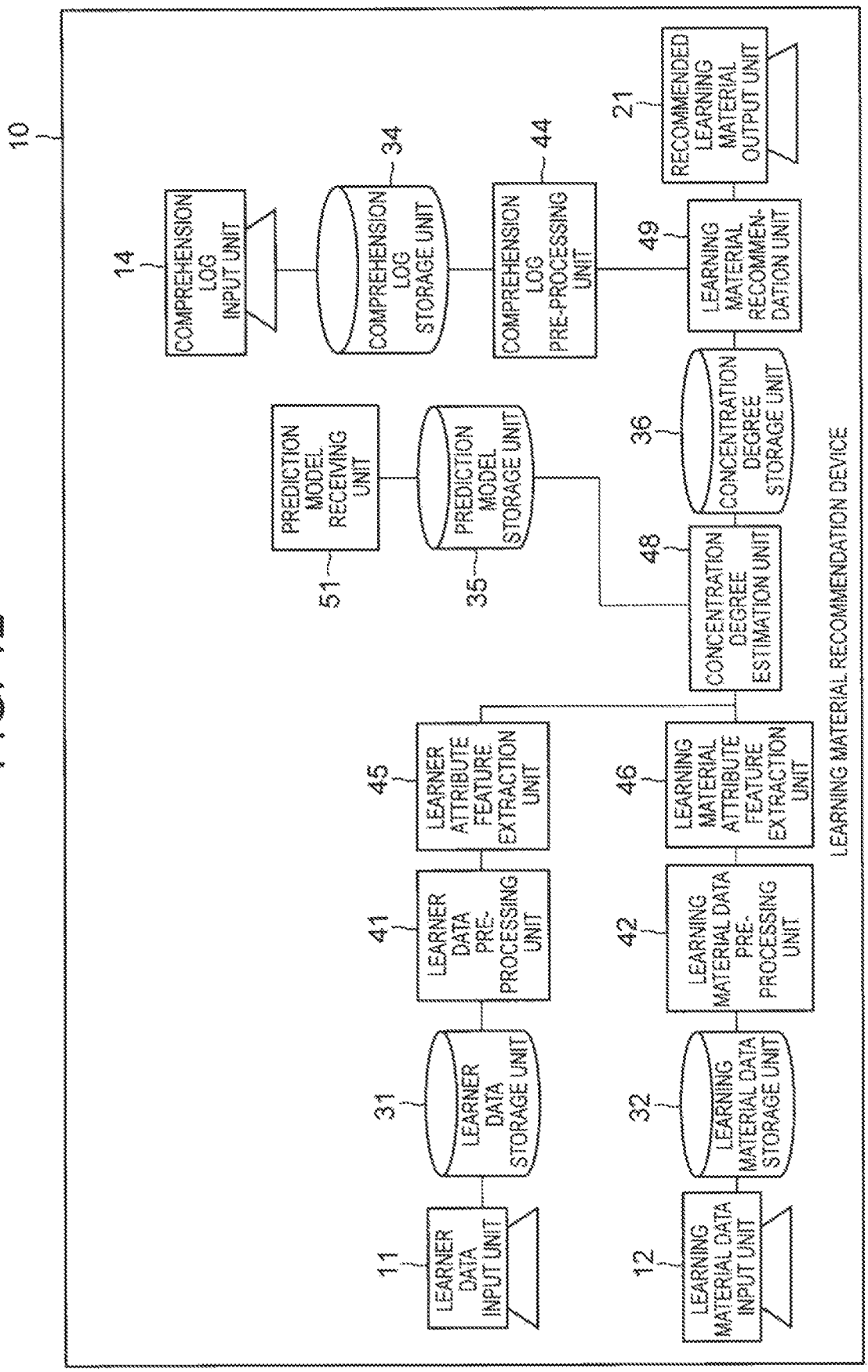
FIG. 12 is a block diagram showing an exemplary configuration of the learning material recommendation device according to a second embodiment.

FIG. 12 is a block diagram showing an exemplary configuration of a learning material recommendation device 10 according to a second embodiment based on such an idea.

The learning material recommendation device 10 shown in FIG. 12 differs from the learning material recommendation device 1 shown in FIG. 1 in that the concentration degree log input unit 13, the concentration degree log storage unit 33, the concentration degree log pre-processing unit 43, and the concentration degree learning unit 47 are excluded, and a prediction model receiving unit 51 is added.

It should be noted that the prediction model receiving unit 51 can also be implemented by a central processing unit (CPU) that executes processing on the basis of a program (except for the hardware portion for receiving data).

The prediction model receiving unit 51 receives a prediction model via the Internet. Although the prediction model may be generated by the processing illustrated in FIG. 8, it may be generated by other processing.

Figure 13:
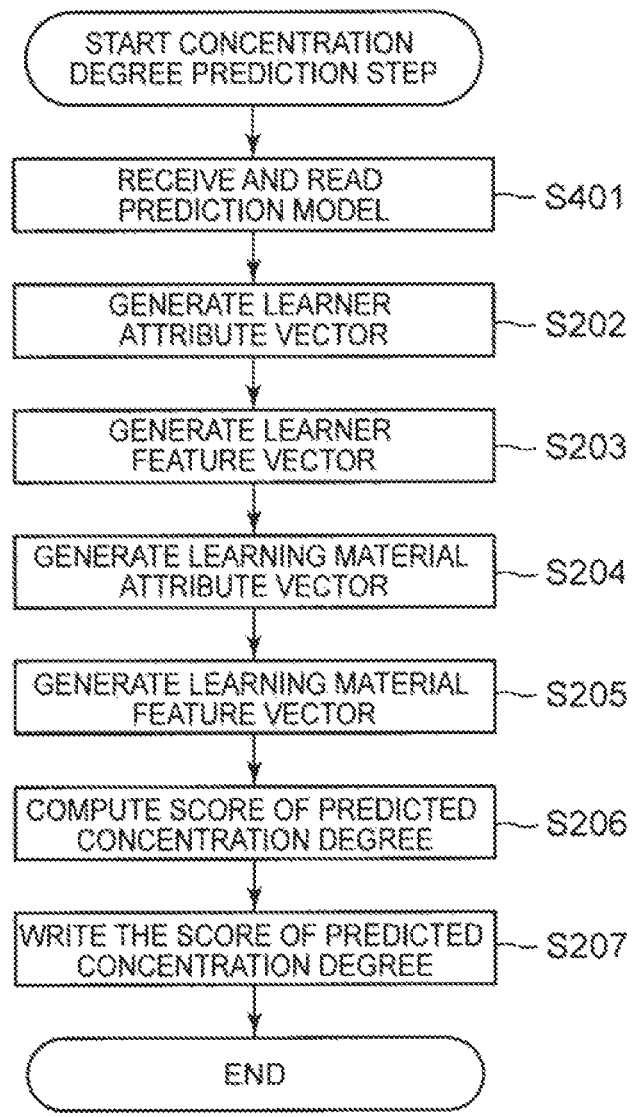
FIG. 13 is a flowchart illustrating an operation of the learning material recommendation device in the concentration degree prediction step in the second embodiment.

FIG. 13 is a flowchart illustrating the operation of the learning material recommendation device 10 in the concentration degree prediction step in the second embodiment.

In the present embodiment, in the concentration degree prediction step, the prediction model receiving unit 51 firstly receives a prediction model, and stores the prediction model in the prediction model storage unit 35. The concentration degree estimation unit 48 then reads the prediction model from the prediction model storage unit 35 (step S401).

The subsequent processing is identical to the processing in steps S202 to S207 in the first embodiment. Further, the operation in the (C) learning material recommendation step is also identical to that in the first embodiment.

In the present embodiment, utilizing the prediction model provided by the prediction model distribution server or the like results in a simplified configuration of the learning material recommendation device 10.

Embodiment 3

In each of the above-described embodiments, the growth was estimated indirectly from the concentration degree on the assumption that there is a strong correlation between the concentration degree and the growth of the learner. However, the growth may be predicted directly. For example, a learner may be requested to self-report his/her growth before and after learning, to directly determine the learner's growth by the learning material.

In such a case, in the block diagram in FIG. 2, the "concentration degree" in the concentration degree log input unit 13, the concentration degree log storage unit 33, the concentration degree storage unit 36, the concentration degree log pre-processing unit 43, the concentration degree learning unit 47, and the concentration degree estimation unit 48 may be replaced with "growth". Further, in the flowcharts in FIGS. 8, 9, and 10, the "concentration degree" may be replaced with "growth". Further, in the flowchart in FIG. 10, the processing in step S304 is unnecessary.

Further, while the "concentration degree" was predicted (estimated) in each of the above embodiments, another variable such as "motivation" may be predicted in place of the "concentration degree". In this case, the "concentration degree" in each of the above embodiments may be replaced with "motivation".

Furthermore, instead of the variable with positive meaning ("concentration degree" or "motivation"), a variable with negative meaning (for example, "stress degree") may be used.

Figure 14:
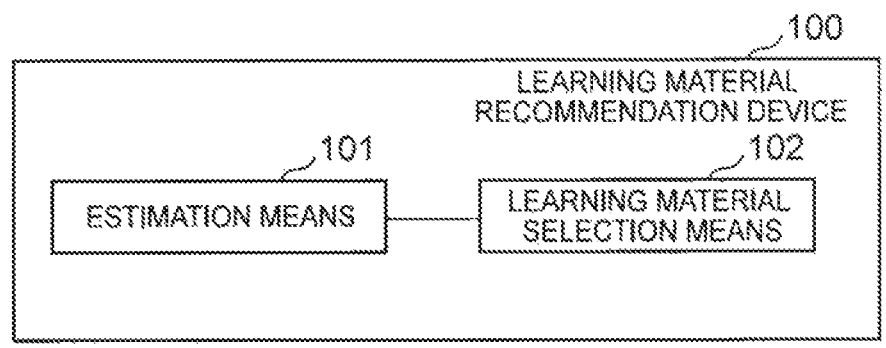
FIG. 14 is a block diagram showing main components of the learning material recommendation device according to the present invention.

FIG. 14 is a block diagram showing the main components of the learning material recommendation device according to the present invention. As shown in FIG. 14, the learning material recommendation device 100 includes: estimation means 101 (implemented, for example, by the concentration degree estimation unit 48) for estimating a concentration degree indicating the degree of concentration of a learner on a learning material, on the basis of learner data including a feature related to the learner and learning material data including a feature related to the learning material; and learning material selection means 102 (implemented, for example, by the learning material recommendation unit 49) for selecting one from among next learning material candidates associated with the learning material, on the basis of a learning state that is specified on the basis of the concentration degree and a comprehension of the learning material by the learner.

The estimation means 101 may be configured to estimate, from the concentration degree, a growth of the learner by the learning material, the growth being correlated with the concentration degree, and the learning material selection means 102 may be configured to select one of the learning material candidates by using the growth.

Figure 15:
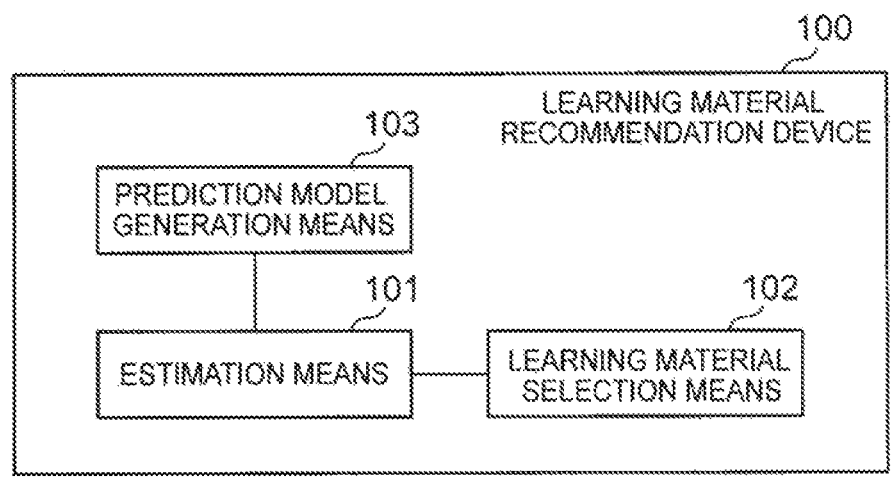
FIG. 15 is a block diagram showing main components of the learning material recommendation device in another aspect.

FIG. 15 is a block diagram showing the main components of the learning material recommendation device according to another aspect. The learning material recommendation device 100 shown in FIG. 15 further includes prediction model generation means 103 (implemented, for example, by the concentration degree learning unit 47) for generating a prediction model by machine-learning a relationship among the learner data of each of a plurality of learners, each of a plurality of learning materials, and an actual concentration degree score based on a report from each of the plurality of learners, wherein the estimation means 101 is configured to estimate the concentration degree by using the prediction model.

Figure 16:
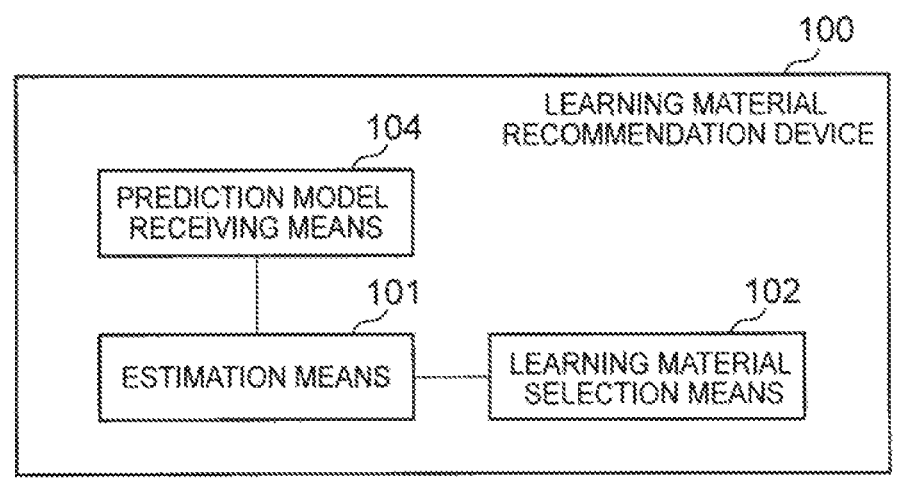
FIG. 16 is a block diagram showing main components of the learning material recommendation device in yet another aspect.

FIG. 16 is a block diagram showing the main components of the learning material recommendation device according to yet another aspect. The learning material recommendation device 100 shown in FIG. 16 further includes prediction model receiving means 104 (implemented, for example, by the prediction model receiving unit 51) for receiving a prediction model generated by machine-learning a relationship among the learner data of each of a plurality of learners, each of a plurality of learning materials, and an actual concentration degree score based on a report from each of the plurality of learners, wherein the estimation means 101 is configured to estimate the concentration degree by using the prediction model.

The learning material recommendation method, the learning material recommendation device, and the learning material recommendation program may be configured as follows.

(1) A learning material recommendation method comprising: judging a learning state of a learner from a score of growth of the learner based on a learning material and a score of comprehension of the learning material by the learner; determining a learning material that should be learned next by the learner on the basis of the judgement result; and presenting the determined learning material.

(2) The learning material recommendation method of (1), comprising: selecting the learning material that should be learned next by the learner from a data table (for example, a learning process table) having set therein information that can specify a learning material that should be selected in accordance with the judgment result of the learning state.

(3) The learning material recommendation method of (1) or (2), comprising: inputting a report on the comprehension from a learner; estimating a concentration degree of the learner on a learning material from a reported concentration degree on the learning material which is reported by the learner (an actual value self-marked by the learner), learner data related to the learner, and learning material data related to the learning material; estimating a growth of the learner by the learning material on the basis of the concentration degree; and judging the learning state using the comprehension and the growth as indices.

(4) The learning material recommendation method of (1) or (2), comprising: inputting a report on the comprehension from a learner; receiving a prediction model; estimating a concentration degree of the learner on a learning material using the prediction model, from learner data related to the learner and learning material data related to the learning material; estimating the growth on the basis of the concentration degree; and judging the learning state using the comprehension and the growth as indices.

(5) A learning material recommendation device comprising: recommended learning material determination means (implemented, for example, by the learning material recommendation unit 49) for judging a learning state of a learner from a score of growth of the learner based on a learning material and a score of comprehension of the learning material by the learner, and determining a learning material that should be learned next by the learner on the basis of the judgement result; and recommended learning material presentation means (implemented, for example, by the recommended learning material output unit 21) for presenting the learning material determined by the recommended learning material determination means.

(6) The learning material recommendation device of (5), wherein the recommended learning material determination means selects the learning material that should be learned next by the learner from a data table (for example, a learning process table) having set therein information that can specify a learning material that should be selected in accordance with the judgment result of the learning state.

(7) The learning material recommendation device of (5) or (6), wherein the recommended learning material determination means judges the learning state using a comprehension of the learning material by the learner and a growth of the learner by the learning material as indices, and wherein the recommended learning material determination means comprising: comprehension input means (implemented, for example, by the comprehension log input unit 14) for accepting a report on the comprehension from the learner; concentration degree estimation means (implemented, for example, by the concentration degree estimation unit 48) for estimating a concentration degree of the learner on the learning material from a reported concentration degree on the learning material which is reported by the learner (an actual value self-marked by the learner), learner data related to the learner, and learning material data related to the learning material; and growth estimation means (implemented, for example, by the learning material recommendation unit 49) for estimating the growth on the basis of the concentration degree.

(8) The learning material recommendation device of (5) or (6), wherein the recommended learning material determination means judges the learning state using a comprehension of the learning material by the learner and a growth of the learner by the learning material as indices, the recommended learning material determination means comprising: comprehension input means for accepting a report on the comprehension from the learner; concentration degree estimation means (implemented, for example, by the concentration degree estimation unit 48) for estimating a concentration degree of the learner on the learning material, using a prediction model, from learner data related to the learner and learning material data related to the learning material; growth estimation means for estimating the growth on the basis of the concentration degree; and prediction model receiving means (implemented, for example, by the prediction model receiving unit 51) for receiving the prediction model from an outside of the learning material recommendation device.

(9) A learning material recommendation program for causing a computer to perform: processing of judging a learning state of a learner from a score of growth of the learner based on a learning material and a score of comprehension of the learning material by the learner and determining a learning material that should be learned next by the learner on the basis of the judgement result; and processing of presenting the determined learning material.

(10) The learning material recommendation program of (9) for causing the computer to perform: processing of inputting a report on the comprehension from a learner; processing of receiving a prediction model from the learning material recommendation device; processing of estimating a concentration degree of the learner on the learning material, using the prediction model, from learner data related to the learner and learning material data related to the learning material; processing of estimating the growth on the basis of the concentration degree; and processing of judging the learning state using the comprehension and the growth as indices.

It should be noted that the present invention is suitably applicable to the self-learning type systems (web education, etc.) used by employees in private companies, and self-learning systems (correspondence education, etc.) used by students in education-related industries (schools, private tutoring schools, preparatory schools, etc.), and also widely applicable to learning in general, related to education.

The foregoing exemplary embodiments may be partly or wholly described in the following supplementary notes, although the structure of the present invention is not limited to such.

(Supplementary note 1) A learning material recommendation method comprising:

estimating a concentration degree indicating the degree of concentration of a learner on a learning material on the basis of learner data including a feature related to the learner and learning material data including a feature related to the learning material; and selecting one from among next learning material candidates associated with the learning material, on the basis of a learning state that is specified on the basis of the concentration degree and a comprehension of the learning material by the learner.

(Supplementary note 2) The learning material recommendation method according to Supplementary note 1, comprising:

in the estimating step, estimating from the concentration degree, a growth of the learner by the learning material, the growth being correlated with the concentration degree; and selecting one of the learning material candidates by using the growth.

(Supplementary note 3) The learning material recommendation method according to Supplementary note 1 or 2, comprising:

generating a prediction model by machine-learning a relationship among the learner data of each of a plurality of learners, each of a plurality of learning materials, and an actual concentration degree score based on a report from each of the plurality of learners; and estimating the concentration degree by using the prediction model.

(Supplementary note 4) The learning material recommendation method according to Supplementary note 1 or 2, comprising:

receiving a prediction model generated by machine-learning a relationship among the learner data of each of a plurality of learners, each of a plurality of learning materials, and an actual concentration degree score based on a report from each of the plurality of learners; and estimating the concentration degree by using the prediction model.

(Supplementary note 5) A learning material recommendation device comprising:

estimation means for estimating a concentration degree indicating the degree of concentration of a learner on a learning material, on the basis of learner data including a feature related to the learner and learning material data including a feature related to the learning material; and learning material selection means for selecting one from among next learning material candidates associated with the learning material, on the basis of a learning state that is specified on the basis of the concentration degree and a comprehension of the learning material by the learner.

(Supplementary note 6) The learning material recommendation device according to Supplementary note 5, wherein the estimation means estimates, from the concentration degree, a growth of the learner by the learning material, the growth being correlated with the concentration degree, and the learning material selection means selects one of the learning material candidates by using the growth.

(Supplementary note 7) The learning material recommendation device according to Supplementary note 5 or 6, further comprising prediction model generation means for generating a prediction model by machine-learning a relationship among the learner data of each of a plurality of learners, each of a plurality of learning materials, and an actual concentration degree score based on a report from each of the plurality of learners, wherein the estimation means estimates the concentration degree by using the prediction model.

(Supplementary note 8) The learning material recommendation device according to Supplementary note 5 or 6, further comprising prediction model receiving means for receiving a prediction model generated by machine-learning a relationship among the learner data of each of a plurality of learners, each of a plurality of learning materials, and an actual concentration degree score based on a report from each of the plurality of learners, wherein the estimation means estimates the concentration degree by using the prediction model.

(Supplementary note 9) A learning material recommendation program causing a computer to perform:

estimation processing of estimating a concentration degree indicating the degree of concentration of a learner on a learning material on the basis of learner data including a feature related to the learner and learning material data including a feature related to the learning material; and learning material selection processing of selecting one from among next learning material candidates associated with the learning material, on the basis of a learning state that is specified on the basis of the concentration degree and a comprehension of the learning material by the learner.

(Supplementary note 10) The learning material recommendation program according to Supplementary note 9, causing the computer to estimate, in the estimation processing, a growth of the learner by the learning material from the concentration degree, the growth being correlated with the concentration degree, and select, in the learning material selection processing, one of the learning material candidates by using the growth.

(Supplementary note 11) A computer readable recording medium having a learning material recommendation program stored therein, the learning material recommendation program, when executed by a processor, performing:

estimation processing of estimating a concentration degree indicating the degree of concentration of a learner on a learning material, on the basis of learner data including a feature related to the learner and learning material data including a feature related to the learning material; and learning material selection processing of selecting one from among next learning material candidates associated with the learning material, on the basis of a learning state that is specified on the basis of the concentration degree and a comprehension of the learning material by the learner.

(Supplementary note 12) The recording medium according to Supplementary note 11, wherein the learning material recommendation program, when executed by the processor, estimates, in the estimation processing, a growth of the learner by the learning material from the concentration degree, the growth being correlated with the concentration degree, and selects, in the learning material selection processing, one of the learning material candidates by using the growth.

While the present invention has been described above with reference to the embodiments and examples, the present invention is not limited to the embodiments or examples above. Various modifications understandable by those skilled in the art can be made to the configurations and details of the present invention within the scope of the present invention.

This application claims priority based on Japanese Patent Application No. 2017-048776 filed on Mar. 14, 2017, the disclosure of which is incorporated herein in its entirety.

REFERENCE SIGNS LIST 1, 10 learning material recommendation device
11 learner data input unit
12 learning material data input unit
13 concentration degree log input unit
14 comprehension log input unit
21 recommended learning material output unit
31 learner data storage unit
32 learning material data storage unit
33 concentration degree log storage unit
34 comprehension log storage unit
35 prediction model storage unit
36 concentration degree storage unit
41 learner data pre-processing unit
42 learning material data pre-processing unit
43 concentration degree log pre-processing unit
44 comprehension log pre-processing unit
45 learner attribute feature extraction unit
46 learning material attribute feature extraction unit
47 concentration degree learning unit
48 concentration degree estimation unit
49 learning material recommendation unit
51 prediction model receiving unit
100 learning material recommendation device
101 estimation means
102 learning material selection means
103 prediction model generation means
104 prediction model receiving means

The invention claimed is:

1. A learning material recommendation method, implemented by a processor, comprising:

vectorizing learner data by dividing text data related to a learner into words by morphological analysis and quantifying appearance frequencies of the words in the text data;

generating a prediction model by machine learning based on, as training data, the vectorized learner data of each of a plurality of learners and each of a plurality of learning materials associated with an actual concentration degree score based on a report from each of the plurality of learners;

estimating a concentration degree indicating the degree of concentration of a target learner on a learning material, on the basis of learner data of the target learner, learning material data of the target learner and the prediction model; and selecting one from among next learning material candidates associated with the learning material, on the basis of a learning state that is specified on the basis of the estimated concentration degree and a comprehension of the learning material by the learner.

2. The learning material recommendation method according to claim 1, further comprising:

when estimating the concentration degree, estimating from the concentration degree a growth of the learner by the learning material, the growth being correlated with the concentration degree; and selecting one of the learning material candidates by using the growth.

3. A learning material recommendation device comprising:

a memory storing software instructions, and one or more processors configured to execute the software instructions to:

vectorize learner data by dividing text data related to a learner into words by morphological analysis and quantifying appearance frequencies of the words in the text data;

generate a prediction model by machine learning based on, as training data, the vectorized learner data of each of a plurality of learners and each of a plurality of learning materials associated with an actual concentration degree score based on a report from each of the plurality of learners;

estimate a concentration degree indicating the degree of concentration of a target learner on a learning material, on the basis of learner data of the target learner, learning material data of the target learner and the prediction model; and select one from among next learning material candidates associated with the learning material, on the basis of a learning state that is specified on the basis of the estimated concentration degree and a comprehension of the learning material by the learner.

4. The learning material recommendation device according to claim 3, wherein the one or more processors are further configured to execute the software instructions to:

estimate, from the concentration degree, a growth of the learner by the learning material, the growth being correlated with the concentration degree, and select one of the learning material candidates by using the growth.

5. A non-transitory computer readable recording medium storing a learning material recommendation program, when executed by a processor, performs, vectorizing learner data by dividing text data related to a learner into words by morphological analysis and quantifying appearance frequencies of the words in the text data;

generating a prediction model by machine learning based on, as training data, the vectorized learner data of each of a plurality of learners and each of a plurality of learning materials associated with an actual concentration degree score based on a report from each of the plurality of learners;

estimation processing of estimating a concentration degree indicating the degree of concentration of a target learner on a learning material, on the basis of learner data of the target learner, learning material data of the target learner and the prediction model; and learning material selection processing of selecting one from among next learning material candidates associated with the learning material, on the basis of a learning state that is specified on the basis of the estimated concentration degree and a comprehension of the learning material by the learner.

6. The recording medium according to claim 5, wherein the learning material recommendation program, when executed by the processor, estimates, in the estimation processing, a growth of the learner by the learning material from the concentration degree, the growth being correlated with the concentration degree, and selects, in the learning material selection processing, one of the learning material candidates by using the growth.

* * * * *